P. J. RENNOLDS.
SYSTEM OF GENERATING AND DISTRIBUTING POWER.
APPLICATION FILED MAY 27, 1919.
1,333,444.
Patented Mar. 9, 1920.
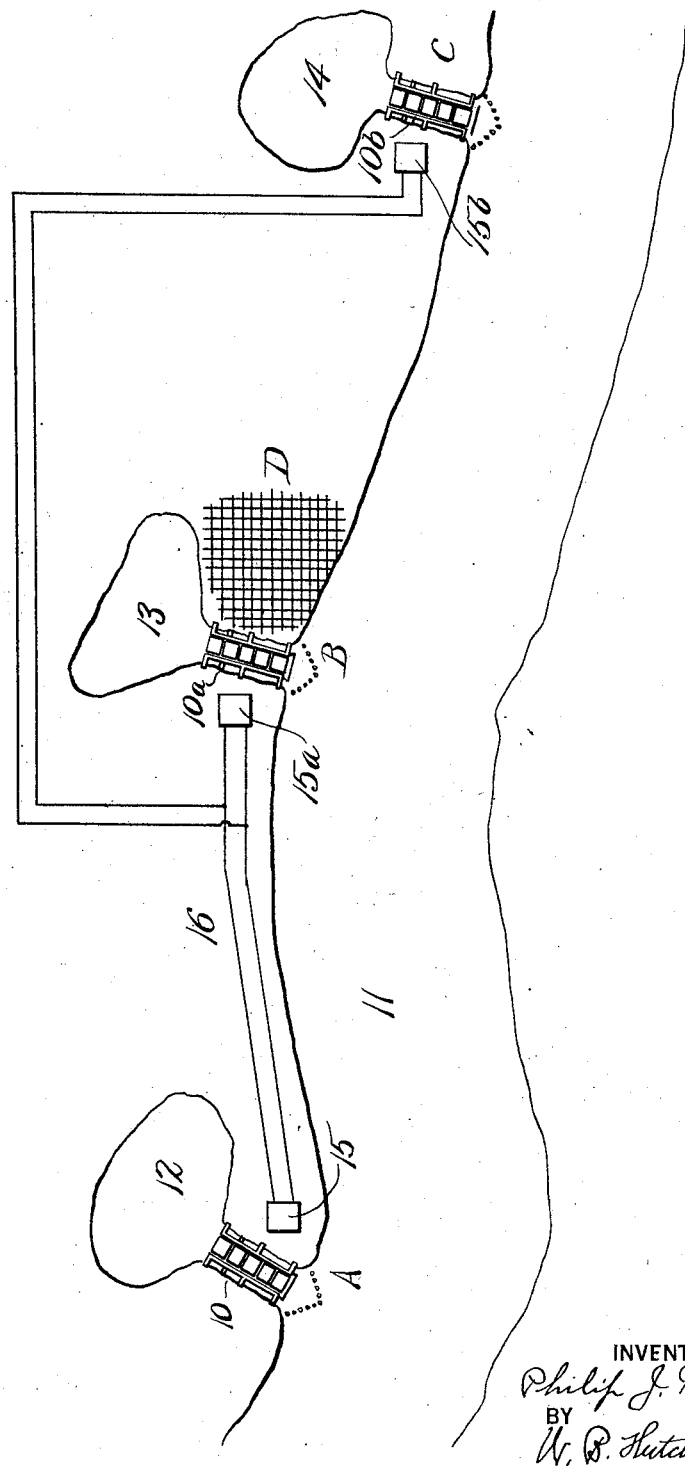

UNITED STATES PATENT OFFICE.

PHILIP J. RENNOLDS, OF NEW YORK, N. Y.

SYSTEM OF GENERATING AND DISTRIBUTING POWER.

1,333,444.　　　　　Specification of Letters Patent.　　Patented Mar. 9, 1920.

Application filed May 27, 1919. Serial No. 300,086.

*To all whom it may concern:*

Be it known that I, PHILIP J. RENNOLDS, a citizen of the United States, and a resident of the city, county, and State of New York, have invented a new and useful Improvement in Systems of Generating and Distributing Power, of which the following is a full, clear, and exact description.

My invention relates to an improved system for generating and distributing power or energy for commercial purposes, and the object of my invention is to produce a system or method by which the force of the tides can be utilized to generate power in large units and great quantities and distribute it economically and practically to a commercial center. The distribution would most naturally be in the form of electrical energy. It is a well known fact that the time of tidal changes varies considerably with comparatively slight changes of latitude, and that the time of such changes varies also in localities not very far removed from each other because of the conformation of the coast. Frequently there will be a change of two hours in the time of the tide in places not more than fifteen or twenty miles north or south of each other. An object of my invention is to take advantage of this provision of nature and locate a series of tidal power plants within a practical distance of a commercial center, and have the several plants supply power to this center. In carrying out this idea I would have each plant practically capable of supplying the power needed for the center where it is to be distributed, or at least each plant would make a substantial part of the power required. Such plants would be located at points where nature would enable them to be conveniently placed, and I would have one plant, for instance, as nearly as possible to the center of distribution, another fifteen or twenty miles, more or less, north of the first plant, and place another one as far south of the first mentioned plant. It is understood, of course, that in tidal water power plants there is a period of about two hours when the plant cannot work effectively, this being at substantially the change of tide. By having the plants located as arranged, however, one would supply the power for a certain period, and when this plant became inactive, another one or two or more, according to circumstances, would supply the power until the first mentioned plant was again in effective operation. Thus I dispense with the expensive and uneconomic storage of power, but have each plant distribute its power economically as generated, while the commercial center, would have a constant and adequate supply. This will be better understood from the description which follows.

Reference is to be had to the accompanying drawing forming a part of this specification, in which similar reference characters indicate corresponding parts in the view.

The view is a diagrammatic view illustrating how a system embracing three plants could be economically arranged.

In the drawing A represents one power plant, B another, and C a third. The plant A is located at a convenient point some distance south of the center D where the power is to be utilized, the plant B is located practically at the center or as nearly thereto as it can be conveniently, while the third plant C is farther north. In this application I lay no stress on the form of the power plant so long as it is a tidal water power plant. A power plant such as shown in my application for Letters Patent of the United States No. 300,085, filed May 27, 1919, can be used to advantage. In such a plant I have a series of water wheels 10 arranged one behind the other in a raceway connecting the source of tide or sea 11 with a basin 12, and the water wheels are swung backward and forward with the ebb and flow of the tide. A second power plant $10^a$ is arranged at B and connects with a second basin 13, while a third would be arranged as shown at $10^b$, and would work in connection with a basin 14. A suitable power house 15, $15^a$, or $15^b$ would be arranged at each plant, and feed lines 16 would connect the several power houses and also distribute the energy through the section D. I have not gone into detail with any circuits because this is all well understood and the view is simply diagrammatic.

It will be seen from the diagram and the description that the plants might work simultaneously, but the period at which each would be inactive would vary considerably, and usually there would be about two hours difference in the tide turn between A and B, and also between B and C. Therefore, when the power plant at A is inactive, the plants B and C would be supplying energy for the section D, and when the plant at B is inactive energy would be supplied from the plant A or C, or both. Likewise when C is inactive the other power plants would supply the energy. Thus it will be seen that I provide a thoroughly practical way of establishing a system on a very large scale by which an entire community could be provided with power at nominal expense and without the necessity of any storage system.

I have not gone into the details of the plants because obviously these can be varied, and the system of converting the water power into other forms of usable energy can be varied indefinitely without affecting the invention. Also it will be seen that so long as a plurality of plants are provided for a given section there can be a greater or less number of these without affecting the invention, the principal thing being to utilize the flow of the tide for generating large units of power, and to arrange these plants at different tidal points so that a constant supply can be had from some one of the plants which can be drawn on at a given center or its vicinity.

I claim:—

1. A system of power generation and distribution comprising a plurality of tidal water powers located at points spaced apart and having different tidal times, and means for distributing the energy of said plants to a common territory, whereby one plant will supply said territory while another plant may be inactive.

2. A system of generating and distributing power to a given territory, comprising a plurality of tide-water power stations, each adapted to supply power to a given territory, said stations being located at points having different periods for the turn of the tide and the combined power capacity of the several plants being sufficiently in excess of the power requirements of the given territory, so that when one station is idle near the turn of the tide the others can meet the requirements of the territory thereby insuring a constant supply.

PHILIP J. RENNOLDS.

Witnesses:
WARREN B. HUTCHINSON,
M. G. O'DONNELL.